Feb. 20, 1962  W. EWALD  3,021,774
DEPTH-OF-FOCUS INDICATOR FOR PHOTOGRAPHIC INSTRUMENTS
Filed April 10, 1959
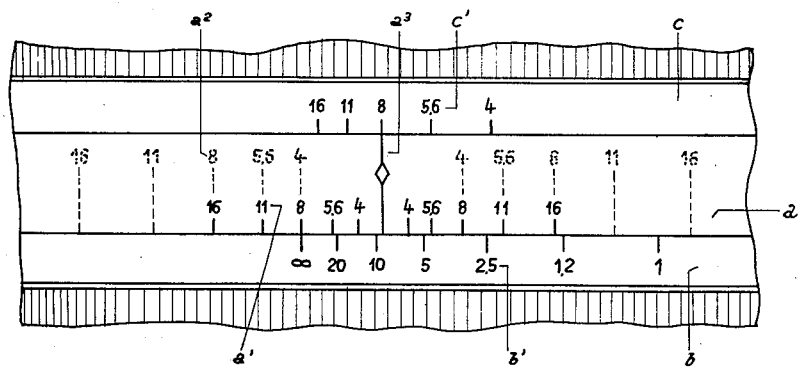
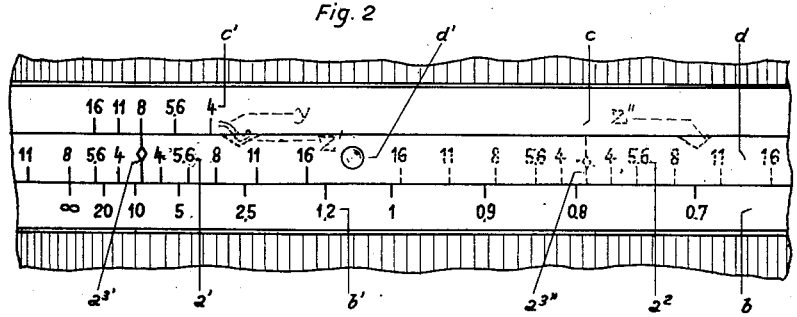
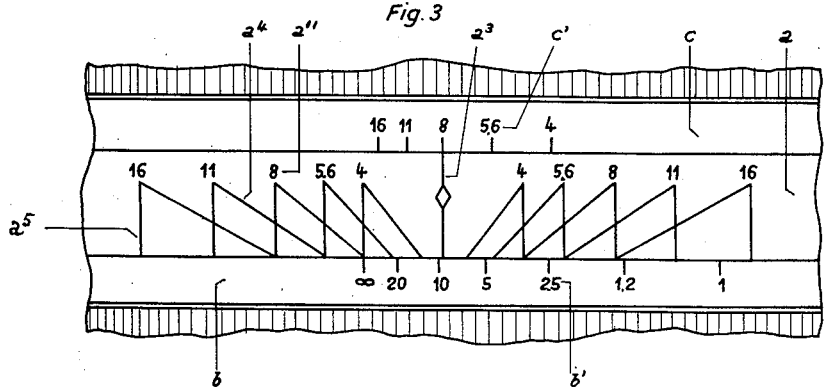
Inventor:
Waldemar EWALD

United States Patent Office 3,021,774
Patented Feb. 20, 1962

3,021,774
DEPTH-OF-FOCUS INDICATOR FOR PHOTO-GRAPHIC INSTRUMENTS
Waldemar Ewald, Bad Kreuznach, Rhineland, Germany, assignor to Jos. Schneider & Co., Optische Werke, Kreuznach, Rhineland, Germany, a corporation of Germany
Filed Apr. 10, 1959, Ser. No. 805,559
Claims priority, application Germany Apr. 17, 1958
1 Claim. (Cl. 95—45)

My present invention relates to a depth-of-focus indicator for photographic cameras or objectives.

The depth of focus, as is well known, represents the range within which an object to be photographed will form a sharp image on a ground-glass plate or a photosensitive surface. This range depends in the first place on the focal adjustment of the objective, secondly on its diaphragm aperture, and finally on the diameter of the so-called blur circle. This latter parameter is not standardized; sometimes it is arbitrarily considered as a predetermined fraction (e.g. one thousandth) of the focal length, yet a more recent tendency is to relate it to the diagonal of the image frame as a normalized focal-length substitute. Moreover, the concept of sharp focusing is subject to variation according to the task at hand, e.g. in dependence upon the presence or absence of a need for further magnification of the resultant image. Thus, one school of thought regards a blur-circle diameter of 0.02 mm. as satisfactory for 8-mm. films whereas others insist upon an upper limit of 0.006 mm. therefor.

Although there have been proposed a large variety of systems for indicating depth of focus on an adjustable camera, all of these systems are necessarily based upon the manufacturer's particular concept of sharp focusing. Since, however, the permissible tolerances will vary under different circumstances, it is an object of my invention to provide a system for indicating depth of focus by different sets of values freely selectable in accordance with the type of object to be photographed, the ultimate magnification desired, or other considerations.

The invention realizes this object through the provision of a distance scale in combination with two or more mutually correlated indicating means so displaceable with respect to that scale as to mark thereon, alternately or simultaneously, two or more overlapping ranges respectively representing at least one narrower and at least one wider depth-of-focus range.

The invention is applicable to systems in which a distance scale co-operates with another scale bearing duplicate values of relative apertures, e.g. as described in my co-pending application Ser. No. 733,957 filed May 8, 1958, now Patent No. 2,976,790 issued March 28, 1961; systems in which a pair of indicator members are arranged to move in opposite directions across the distance scale, e.g. as disclosed in commonly assigned applications Ser. Nos. 373,326 (Franz Werner) filed August 10, 1953, now Patent No. 2,901,956 issued September 1, 1959, 621,492 (Karl Heinz Schütz) filed November 8, 1956, now Patent No. 2,916,980 issued December 15, 1959, and 665,204 (Werner and Schütz) filed June 12, 1957, now Patent No. 2,916,918, likewise issued December 15, 1959; and systems wherein an axially movable indicator member bears distinctively marked zones of different peripheral width selectively viewable through a window or slot, e.g. as described in commonly assigned applications Ser. Nos. 714,251, filed February 10, 1958 by Albert Baab, now Patent No. 2,949,836 issued August 23, 1960.

The invention will be described in greater detail with reference to the accompanying drawing in which FIGS. 1, 2 and 3 illustrate, in fragmentary developed view, the scale carriers of three different types of objectives embodying the invention.

The objective system illustrated in FIG. 1 comprises a stationary housing $a$ on which a focusing ring $b$ and a diaphragm-setting ring $c$ are movable in a manner well known per se. Ring $b$ bears a distance scale $b'$ while ring $c$ bears a scale $c'$ of diaphragm apertures. Between them, the housing portion $a$ is provided with a subscale $a'$ on which the values of scale $c'$ are duplicated at opposite sides of a reference mark $a^3$, along with a second subscale $a^2$ which comprises the same diaphragm-stop values symmetrically duplicated about mark $a^3$ but spread over a greater peripheral distance than the corresponding values of scale $a'$. The two stationary subscales $a'$ and $a^2$ have been illustrated respectively in solid and in dotted lines and may, of course, be distinguished from each other by color, background or other characteristics.

Following the adjustment of rings $b$ and $c$ to the distance and the diaphragm stop required, for example to a distance of 9 meters (or feet) and an aperture ratio of 1:8 as read at the mark $a^3$, the user determines his depth of focus by noting the distances on scale $b'$ adjacent the selected diaphragm-stop values (here the two numerals 8) on either the subscale $a'$ or the subscale $a^2$. In the particular position illustrated in FIG. 1, the sharp-focusing range will extend from ∞ to approximately 3 for very sharp definition and from ∞ to about 1.3 under less exacting conditions.

In FIG. 2 I have illustrated a system generally similar to that of FIG. 1 wherein, however, an adjustable ring $d$ surrounds the stationary objective housing (not shown) between the rings $b$ and $c$. Ring $d$ bears the two subscales $a'$ and $a^2$ next to each other in peripheral alignment, the center mark $a^{3'}$ of subscale $a'$ being duplicated at $a^{3''}$ in subscale $a^2$. A knob $d'$ serves to displace the ring $d$ between two angularly spaced positions in which either the subscale $a'$ or the subscale $a^2$ is operatively aligned with the scales $b'$ and $c'$. To index the ring $d$ in either of these positions, a spring $y$ may be attached to the stationary objective housing underneath ring $c$ so as to be engageable with either of two notches $z'$ and $z''$ in ring $d$.

The position illustrated in FIG. 2 corresponds to the setting of FIG. 1 but allows only the reading of the narrower (sharp-definition) focal range; for an ascertainment of the wider range, the ring $d$ must be shifted by means of the knob $d'$ into its alternate position in which spring $y$ enters the notch $z''$.

The arrangement of FIG. 3 is similar to that of FIG. 1, except that the single scale $a''$ on stationary housing portion $a$ has two sets of lead lines $a^4$, $a^5$ extending from its numerical values which represent the several diaphragm stops. Thus, lines $a^4$ slant toward the center mark $a^3$ so that their terminations adjacent scale $b$ define a relatively narrower range as do the values of subscales $a'$ in the preceding embodiments, the lead lines $a^5$ extending in axial directions so as to mark a wider range of values on the scale $b'$ as heretofore described for the subscales $a^2$.

It will be understood that the various embodiments described above and shown in the drawing are merely illustrative of the many modes of realization of the basic principles of the present invention, various modifications being of course possible without departing from the spirit and scope of the appended claims.

I claim:

In a photographic instrument, in combination, an objective provided with focusing means including a rotatable ring bearing a distance scale, depth-of-focus indicator means positioned for co-operation with said distance scale to establish a plurality of focusing ranges with different degrees of definition, said indicator means comprising a rotatable annular member on said objective bearing a stationary scale, said stationary scale being divided into several subscales positioned on different peripheral zones of said annular member, said annular member being located adjacent said ring and having a plurality of positions of rotary adjustment in which respective subscales register with said distance scale, each of said subscales bearing duplicate values of diaphragm stops on opposite sides of a reference mark, said duplicate values being spread over arcs of different lengths at said several subscales, and indexing means for selectively retaining said annular member in any of said positions of adjustment.

References Cited in the file of this patent

UNITED STATES PATENTS

| | | |
|---|---|---|
| 1,329,729 | Swartz | Feb. 3, 1920 |
| 1,650,704 | Gaa | Nov. 29, 1927 |
| 2,315,977 | Mihalyi | Apr. 6, 1943 |
| 2,527,106 | Smith | Oct. 24, 1950 |
| 2,536,500 | Hinden | Jan. 2, 1951 |
| 2,541,469 | Gunchard | Feb. 13, 1951 |
| 2,914,998 | Rohloff et al. | Dec. 1, 1959 |

FOREIGN PATENTS

| | | |
|---|---|---|
| 300,619 | Switzerland | Aug. 15, 1954 |